United States Patent

[11] 3,616,394

| [72] | Inventors | Edward E. Koepke<br>Riverside;<br>James M. Throne, Country Club Hills, both of Ill. |
|---|---|---|
| [21] | Appl. No. | 804,017 |
| [22] | Filed | Mar. 3, 1969 |
| [45] | Patented | Oct. 26, 1971 |
| [73] | Assignee | Continental Can Company, Inc.<br>New York, N.Y. |

[54] ELECTROPHORETIC REPAIR COATING OF ENAMEL COATED SUBSTRATES
8 Claims, No Drawings

| [52] | U.S. Cl. | 204/181 |
|---|---|---|
| [51] | Int. Cl. | C23b 13/00,<br>B01k 5/02 |
| [50] | Field of Search | 204/181 |

[56] References Cited
UNITED STATES PATENTS

| 3,385,777 | 5/1968 | Haycock et al. | 204/181 |
|---|---|---|---|
| 3,304,250 | 2/1967 | Gilchrist | 204/181 |
| 3,441,489 | 4/1969 | Gacesa | 204/181 |
| 3,476,666 | 11/1969 | Bell et al. | 204/181 |

*Primary Examiner*—Howard S. Williams
*Attorneys*—Paul Shapiro, Joseph E. Kerwin and William A. Dittman ABSTRACT: In a process for electrophoretic repair coating of articles coated with base coat enamels, the shaped article having a hardened enamel coating applied thereto is heated or baked at a temperature between about 300° and about 450° F. before contact of the enamel coated article with the electrophoretic coating bath.

ELECTROPHORETIC REPAIR COATING OF ENAMEL COATED SUBSTRATES

BACKGROUND OF THE INVENTION

1. Field of the Invention

This invention relates to coating articles, and in particular, to coating electrically conductive surface areas of articles by electrophoretic deposition of organic film-forming materials.

2. The Prior Art

Can bodies and ends therefor have the interior surfaces thereof coated with an enamel where the cans are intended to contain beverages or varieties of food products. A thin coating of enamel is usually applied to the interior metal surface of the can by a roller coating process before it is shaped to form the can. During the shaping operation, the enamel is usually scratched or otherwise subjected to minor damage which exposes small areas of the metal, rendering the interior can surface liable to corrosion by the contents thereof. The damage effected to the interior enamel coating during can shaping is generally repaired by spraying the interior of the can with a coating of lacquer after fabrication but before attachment of the bottom end. This process is extremely wasteful of lacquer because not only is the lacquer sprayed onto the damaged areas, but it is also sprayed on those areas which are undamaged, and which consequently do not require further coating.

In addition to lacquer spraying, repair coating of enamel-coated metal surfaces can be effected by electrophoretic deposition from aqueous dispersions of suitable polymeric coating materials. In this repair coating process, the coated metal article to be repair coated is immersed in an electrophoretic bath which generally consists of particles of the polymeric repair coating material suspended in an aqueous electrolytic solution. The exposed bare conducting surface areas of the article to be repair coated serve as one electrode of the electrocoating bath. When a potential of the required polarity is applied between the article to be repair coated and a second electrode which completes the electrical circuit and is dipped into the aqueous coating suspension, the particles of the repair coating material are deposited on the article's exposed areas in the form of a uniform layer. Although such repair coating of can bodies has been successful, the repair coating procedure, although effective, is still susceptible to improvement and the art is continually seeking ways of more effectively repairing enamel coatings so as to obtain a more substantially fault-free coating.

SUMMARY OF THE INVENTION

In accordance with the present invention, there is provided a method of coating metal articles which includes applying an enamel coating to the surface of a metal, curing the coating to a hard film, shaping the coated metal into an article, baking the coated article at a temperature between about 300° and about 450° F., and then contacting the baked enamel coated surface of the article with an electrophoretic bath having a synthetic polymer resin dispersed therein and electrophoretically depositing the synthetic polymer resin on the exposed electrically conductive areas of the enamel coated article surface.

As will hereinafter be illustrated, the step of baking the shaped enamel coated article before exposure of the enamel coated surface of the article to an electrophoretic bath results in a coated surface of superior quality when compared to similar enamel coated article surfaces which have not been subjected to a baking step.

PREFERRED EMBODIMENTS

In the process of the present invention, any of the thermoplastic or thermosetting resins conventionally used in the coating art may be employed for enamel coating the metal substrate.

Typical thermosetting resins which may be employed as enamel coatings include epoxy include resins of the type which are polymeric reaction products of polyfunctional halohydrins with polyhydric phenols having the structural formula:

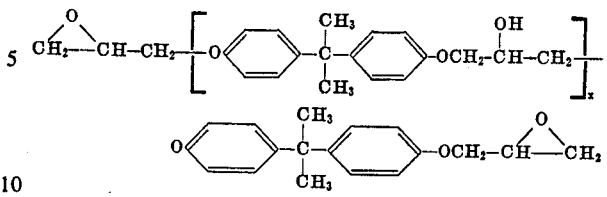

wherein $x$ represents the number of molecules condensed. Typical polyfunctional halohydrins are epichlorohydrin, glycerol dichlorohydrin and the like. Typical polyhydric phenols are resorcinol and a 2,2-bis (4-hydroxyphenyl) alkane, the latter resulting from the condensation of phenols with aldehydes and ketones, including formaldehyde, acetaldehyde, propionaldehyde, acetone, methyl ethyl ketone and the like, which result in such compounds as 2,2-bis(4-hydroxyphenyl) propane and the like compounds. These epoxy resins normally contain terminal epoxy groups but may contain terminal epoxy groups and terminal hydroxyl groups.

In place of or in admixture with the epoxy resins, any of the well-known class of heat-hardenable phenolic resins produced by condensing a phenolic compound with an aldehydic compound may be employed as thermosetting enamel coating materials.

The thermosetting phenolic resin preferably consists of a phenol/aldehyde resin advanced in its condensation to an intermediate condition or B-stage in which the resin is water insoluble, but soluble in selected organic solvents and capable of further reaction under the influence of heat, into the insoluble or "C" state.

Exemplary phenols suitable for the preparation of phenol/formaldehyde resins include phenol itself, the ortho-, para- and meta-cresols, the xylenols, the dihydroxy benzenes, such as resorcinol, the polynuclear phenols such as the naphthols, and the various alkylated, aralkylated, carboxylated, alkyloated, etc., derivatives of these types, such as o-ethyl phenol, carvacrol, salicylic acid and the like.

Formaldehyde is the aldehydic compound preferred for condensation with the phenolic compound, but in general any methylene-containing agent, such as formaldehyde, para-formaldehyde, hexamethylene tetramine, acetaldehyde, and the like may be used.

Amine-aldehyde resins may also be employed in preparing thermosetting enamel coatings either separately or in combination with epoxy and/or phenolic resins.

The term "amine-aldehyde" resin includes aldehyde condensation products of melamine, urea, aceto-guanamine, or a similar compound. Generally, the aldehyde employed is formaldehyde, although useful products can be made from other aldehydes, such as acetaldehyde, crotonaldehyde, acrolein, benzaldehyde, furfural, and others. Condensation products of melamine or urea are the commonly employed amine-aldehyde resins.

Other thermosetting resins which may be employed as enamel coating materials include polybutadiene, oleoresins based on china-wood or tung oil, oleoresin/formaldehyde resins and combinations of these resins with each other and the above described resins.

Thermoplastic resins which may be employed as enamel coatings include the vinyl chloride polymer resins, such as polyvinyl chloride, vinyl chloride/vinyl acetate copolymers, vinyl chloride/vinylidene chloride copolymers, vinyl chloride/alkyl maleate copolymers, vinyl chloride/acrylonitrile copolymers, vinyl chloride/vinyl acetate/vinyl alcohol copolymers, vinyl chloride/vinyl acetate/maleic anhydride copolymers, ethylene/vinyl acetate copolymers, ethylene/ethylene acrylate copolymers and the like. These thermoplastic resins may be used in combination with any of the thermosetting resins to prepare enamel coatings.

For application to metal surfaces, the above-described resins or mixtures of these resins are dissolved in suitable solvent systems, such as organic ketones, such as methyl ethyl ketone, methyl isobutyl ketone, isophorone, cyclohexanone, and aromatic hydrocarbons, such as xylene and toluene, and mixtures thereof, to provide a coating solution of the necessary viscosity for application to the metal surfaces.

The enamel coating compositions are applied as a liquid solution to the metal surface, such as steel, aluminum and the like, by any of the conventional methods employed by the coating industry. In the coating of metal sheet used in container fabrication, roller coating is a preferred method, as the desired coating weight is easily and conveniently applied in a single coat. For general coating purposes, spraying, dipping and flow coating are useful methods of application.

The applied coating after substantial volatile loss of solvent is cured to a hard film by heating the coated substrate at a temperature between about 300° and about 450° F. for about 1 to 10 minutes. The preferred coating weight for coating metal sheet substrates with an adequately protective coating for use as an enamel for containers is in the range of about 1 to 10 milligrams of dry coating per square inch of substrate surface.

The metal sheet stock coated with the hardened enamel coating may then be shaped or stamped into container body parts and container end closures which may subsequently be fabricated into cylindrical metal containers having the metal surfaces thereof coated with the hardened enamel coating as the interior surface of the container. As coating fracture may occur during the mechanical operations in shaping the enamel coated metal sheet, the assembled container having a coated bottom closure seamed to the tubular wall portion is contacted with an electrophoretic solution to repair and coat any bare exposed portions of the enamel coated metal surface.

In accordance with the present invention, before the enamel coated container is contacted with the electrophoretic repair coating solution, the enamel coated surface of the container is heated or baked at a temperature of about 300° to about 450° F. and preferably at about 350° to about 385° F. for at least one second and generally 4 to 120 seconds. As will hereinafter be illustrated, this heating or "prebaking" of the enamel coated container before electrophoretic repair coating, improves the effectiveness of the electrophoretic coating process in reducing the exposed areas of the enamel coated surface.

The specifications for prebaking the hardened enamel coating can be varied as to the time:temperature factor. Desirable coordinations of time and temperature are 5 to 120 seconds at 355° to 385° F., or 3 to 5 seconds at 355° to 450° F.

To effect the electrophoretic coating of the heat treated enamel coating, a synthetic polymer resin containing electrolyte is contacted with the prebaked enamel coated body. To effect deposition of the polymeric repair coating material from the electrophoretic coating bath, an electrical current is caused to flow between the enamel coated body to be repair coated and a suitable electrode immersed in the electrophoretic coating bath by establishing a DC potential between the enamel coated body and the electrode and permitting the electrical current to flow until the electrically conducting surface areas of the enamel coated body have been coated with polymer deposited from the bath. The electrophoretic polymer coating is deposited only on those areas of the enamel coated bodies in which the enamel coating may have been damaged because, due to the electrical insulating properties of the enamel coating, no polymer is electrodeposited on the adequately enamel coated areas of the bodies.

The electrical potential applied in the electrophoretic bath to deposit the repair coating is controlled below the value at which dielectric breakdown of the deposited coating occurs and may range from between about 20 volts to about 2,000 volts per inch of electrode spacing.

The time required to effect repair coating is not critical since coating of the exposed portions of the enamel coating to be repaired begins in a fraction of a second from the point where the electrical circuit is closed and stops when the insulating repair coating is deposited. Thus, the time used to effect the repair coating may range between about 2 second and about 120 seconds.

The current density to be selected for the electrophoretic deposition varies and generally will depend upon such parameters as the selected voltage, the conductivity of the electrophoretic coating bath, and the time allotted for the formation of a coating. Generally, the electrophoretic processing voltage is preferably varied from about 100 to about 900 volts per inch of electrode spacing to coat the exposed areas of the enamel coating within a reasonable time, e.g., about 2 to about 5 seconds.

The temperature of the electrophoretic bath is not critical other then the baking and freezing point of the colloidal suspension used as the electrophoretic bath. For practical applications it is preferred to use temperatures in the range of about 15° to about 60° C.

The electrophoretic coating bath used in the process of the present invention is a colloidal suspension consisting of charged particles of a synthetic polymer resin dispersed in a suitable liquid electrolyte. The synthetic polymer resin dispersed in the electrophoretic bath may be the same as or different from the resin used as the original enamel coating. Preferably, the resins utilized in the electrophoretic coating baths of the present invention are any resins, thermoplastic or thermosetting, which have free carboxylic acid groups or hydroxyl groups.

Illustrative examples of resins which have free carboxylic acid or hydroxyl groups which may be used in the electrophoretic baths include acrylic resins such as polyacrylic acid, polymers of hydroxyalkyl esters of $\alpha$, $\beta$-ethylenically unsaturated carboxylic acids, such as poly (2-hydroxyethyl acrylate), poly (2-hydroxypropyl methacrylate), copolymers of ethylene and $\alpha$, $\beta$-ethylenically unsaturated carboxylic acids, such as ethylene/acrylic acid copolymers, ethylene/methacrylic acid copolymers, polymers of mono- and di-esters of unsaturated dicarboxylic acids, such as maleic acid, fumaric acid, and itaconic acid, in which at least one of the esterifying groups contains a hydroxyl group, such as polymers of mono (2-hydroxyethyl) maleate, mono (2-hydroxypropyl) fumarate, and the like.

The above described resins may be further blended with an alkoxy methyl aminoplast, such as a methoxy melamine ester, methoxy methyl benzoguanamine ether, or butylated urea/formaldehyde resin to obtain heat hardenable resin formulations containing about 60 to 95 percent of the carboxylic acid or hydroxyl group containing resin and about 5 to about 40 percent by weight of the aminoplast resin.

A stable dispersion of these resins in water is made in the presence of ammonia or triethanolamine. An anionic surface active agent may be utilized if necessary.

The concentration of resin solids in the electrophoretic bath may be widely varied. In general, the solids content of the synthetic polymer resin in the bath may be varied from 4 to 15 percent by weight.

After the synthetic polymer resin is electrophoretically deposited on the enameled article surface, the article is separated from the bath and rinsed with water to remove adhering portions of the coating solution. Following rinsing, the electrophoretically coated article is placed in an oven and baked at an elevated temperature, e.g., about 300° to about 450° F. for about 1 to about 20 minutes to remove all volatile material and cure the electrophoretically deposited coating to a hardened film.

To illustrate the manner in which the present invention may be carried out, the following examples are given. It is to be understood, however, that the examples are for the purpose of illustration, and the invention is not to be regarded as limited to any of the specific materials or conditions recited therein.

EXAMPLE I

A solution of a mixture of epoxy and urea/formaldehyde resins in a volatile solvent was applied to the surface of a steel plate by means of a roller to deposit a coating at a coating weight of 3.5 mg./m.$^2$ of steel surface. The coating was heated for 8 minutes at 410° F. to remove the solvent and to cure the epoxy-urea/formaldehyde resin mixture to a hard enamel film. Blanks were cut from the epoxy-urea/formaldehyde resin mixture coated metal sheet and fabricated into open cylinders having a welded side seam to form the body of a container wherein the enamel coated side of the blanks formed the interior of the container. The container body was closed at one end with end closures cut from a similarly enamel coated sheet which was double seamed to the cylinder wall.

The containers so formed were placed in a forced air oven and baked at 355° F. for 120 seconds. The heat-treated or "prebaked" containers were allowed to cool. The containers were then filled with an electrophoretic bath consisting of 5 percent resin solids dispersed in an aqueous triethanolamine solution. The resin solids were composed of a mixture of 85 percent by weight of a 70 percent hydroxyl functional acrylic resin and 15 percent by weight melamine/formaldehyde resin.

A steel electrode was placed in the container in a position so that all the points on the electrode surface were one-fourth inch to one-half inch from the nearest point on the inside of the container.

A current having a potential of about 450 volts was applied across the electrode and the container for about 5 seconds, the container being the anode. After the application of the current, the container was inverted to remove the bath liquid. The inverted container was rinsed with water and baked for 4 minutes at 355° C. in a force air oven.

A series of similarly fabricated containers were repair coated following the above procedure using containers coated with different enamel coatings.

The quality of the electrophoretically repair-coated enamel coatings was evaluated using the Enamel Rater test. This test provides an index of coating quality in terms of metal exposure. Under the conditions of this test, a low voltage is applied between an electrode immersed in an electrolyte (2 % $Na_2SO_4$ solution) filled container body. The presence of metal exposure is detected by a flow of current as indicated on an Enamel Rater meter available from the Wilkens-Anderson Company. Since the magnitude of current which flows is related to the total area of metal exposed to the electrolyte, the meter reading (in milliamperes) provides a relative measure of total exposed areas on the coated surface.

The Enamel Rater test results of container bodies coated in accordance with the practice of the present invention are summarized in table I below under the heading "prebaked." For purposes of contrast, as a control test, container bodies which had been coated and fabricated in a similar manner but which had not been heated prior to being electrophoretically repair coated were also evaluated by the Enamel Rater test. The results of these control tests are also listed in table I below under the heading "control."

TABLE I

| Enamel Coating | Enamel Rater Reading (Ma)* | |
| --- | --- | --- |
|  | Prebaked | Control |
| Epoxy-urea/formaldehyde resin (1) | 0.47 | 2.7 |
| Vinyl chloride polymer resin (2) | 0.07 | 125+ |
| Acrylic-melamine/formaldehyde resin (3) | 5.6 | 125+ |
| Phenol/formaldehyde resin (4) | 1.5 | 125+ |

*Average of 8 containers.

(1) Epoxy-urea/formaldehyde resin blend composed of about 80 percent high molecular weight epoxy resin, and 20 percent urea/formaldehyde resin.

(2) Mixture of vinyl chloride polymer resins composed of 59 percent polyvinyl chloride, 8 percent vinyl chloride/vinyl acetate copolymer, 14 percent epoxy resin (a condensation product of epichlorohydrin and Bisphenol A, having a molecular weight between 350 and 400), 14 percent plasticizer (epoxidized linseed oil), 4 percent phenol/formaldehyde resin, and 1 percent melamine/formaldehyde resin.

(3) A heat-hardenable acrylic-melamine/formaldehyde resin blend composed of about 70 percent by weight hydroxyl functional acrylic resin and about 30 percent by weight melamine/formaldehyde resin.

(4) B-stage phenol/formaldehyde resin.

By reference to the table, it is immediately apparent that the enamel coated articles which are heattreated or prebaked in accordance with the present invention before they are electrophoretically repair coated are of much improved quality when compared to enamel coated articles which are not heated before exposure to an electrophoretic bath.

EXAMPLE II

A series of open cylinders enamel coated with the vinyl chloride polymer resin of example I were prebaked and electrophoretically repair coated before closing one end of the cylinder. The enamel coated cylinders were prebaked at about 300° to about 450° F. using a variety of different sources of heat for the treatment. The prebaked cylinders were electrophoretically repair coated in accordance with the procedure of example I. The type of heat treatment, the time of prebaking, and the Enamel Rater test results of both prebaked and nonprebaked or control samples are recorded in table II below.

TABLE II

| Test No. | Type of Heat Treatment | Prebaking Time (seconds) | Enamel Rater Reading (Ma) | |
| --- | --- | --- | --- | --- |
|  |  |  | Prebaked | Control |
| 1 | 100 ampere infra-red oven | 3 to 5 | 0.36 | 15 |
| 2 | Rotation of cylinder in direct gas flame of air-gas burner of "Selas" type | 1 to 6 | 0.26 | 7.0 |
| 3 | Rotation of cylinder between two induction heating coils | 0.5 to 30 | 0.64 | 12 |

The data in table II indicate that enamel-coated container surfaces prebaked by a variety of different methods before they are electrophoretically repair coated in accordance with the present invention are of much improved quality when compared to enamel coated surfaces which do not undergo a prebake treatment before exposure to an electrophoretic bath.

What is claimed is:
1. A method of preparing a metal article having a coated surface which comprises the steps of:
   a. applying an organic coating material to the surface of a metal;
   b. hardening the coating on the metal surface to a continuous film;
   c. shaping the coated metal into an article;
   d. baking the coated article at an elevated temperature;
   e. causing the baked, coated surface of the article to contact an electrophoretic bath having charged particles of an organic coating material dispersed therein, the coated article surface serving as a first electrode;
   f. causing a second electrode to contact said electrophoretic bath and causing a direct electric current to flow in the bath between the baked coated article surface and the second electrode until any exposed electrically conducting surface areas of the coated article surface have been electrophoretically coated with the organic coating material, and then g. heating the article surface to harden the electrophoretically deposited organic coating.

2. The method of claim 1 wherein the organic coating material is a thermoplastic resin.

3. The method of claim 1 wherein the organic coating material is a thermosetting resin.

4. The method of claim 1 wherein the organic coating material is a vinyl chloride chloride polymer resin.

5. The method of claim 1 wherein the organic coating material is a mixture of an epoxy resin and a urea/formaldehyde resin.

6. The method of claim 1 wherein the organic coating material is a mixture of a hydroxy functional acrylic resin and a melamine/formaldehyde resin.

7. The method of claim 1 wherein the organic coating material is a phenol/formaldehyde resin.

8. The method of claim 1 wherein the shaped coated article is baked at a temperature between about 300° to about 450° F. for about 1 to about 120 seconds before causing the coated article surface to contact the electrophoretic bath.

* * * * *